No. 3,451. REISSUED MAY 18, 1869.
M. VOORHEES & G. W. N. CUSTIS.
PROCESS AND APPARATUS FOR SEASONING AND IMPREGNATING WOOD WITH PRESERVATIVE MATERIAL.
2 SHEETS—SHEET 1.
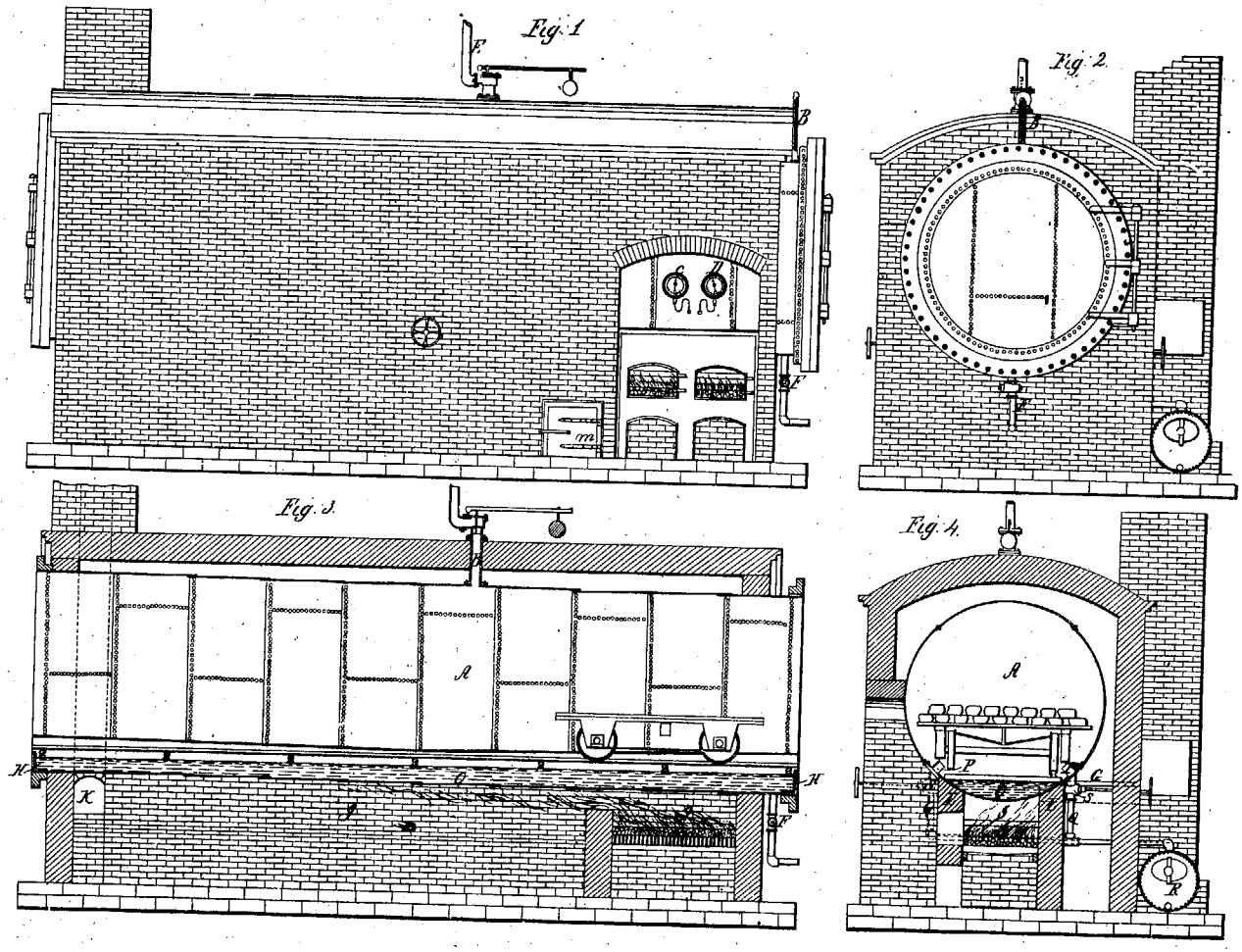
Witnesses;
John J. Halstead
Frank Hamilton
Inventors;
Martin Voorhees & Geo. W. N. Custis
by Cushy, Hassard & Gould
Attys.

No. 3,451.

REISSUED MAY 18, 1869.

M. VOORHEES & G. W. N. CUSTIS.

PROCESS AND APPARATUS FOR SEASONING AND IMPREGNATING WOOD WITH PRESERVATIVE MATERIAL.

2 SHEETS—SHEET 2.

John J. Halstead
Frank Hamilton
Witnesses:

Inventors:
Martin Vanhuer Jr. & G. W. N. Custis
by Crosby, Halstead & Gould, their Attorneys

UNITED STATES PATENT OFFICE.

MARTIN VOORHEES, OF PRINCETON, AND G. W. N. CUSTIS, OF CAMDEN, N. J.

IMPROVED PROCESS AND APPARATUS FOR SEASONING AND IMPREGNATING WOOD WITH PRESERVATIVE MATERIAL.

Specification forming part of Letters Patent No. 87,226, dated February 23, 1869; Reissue No. 3,451, dated May 18, 1869.

*To all whom it may concern:*

Be it known that we, MARTIN VOORHEES, of Princeton, in the State of New Jersey, and GEORGE W. N. CUSTIS, of Camden, in the same State, have invented certain improvements in the application of the process of seasoning and drying wood, and of preserving wood, textile fabrics, &c., from mold and decay and from the attacks of worms, by subjecting them to the action of vapors of coal-tar, oil, or other oleaginous, resinous, or antiseptic substances or compounds, and in the application of other processes in which heat is applied to the substance used in treatment, in whole or in part, and in the apparatus used in such application; and we do hereby declare that the following, taken in connection with the drawings which accompany and form part of this specification, is a description of our invention sufficient to enable those skilled in the art to practice it.

Figure 6:
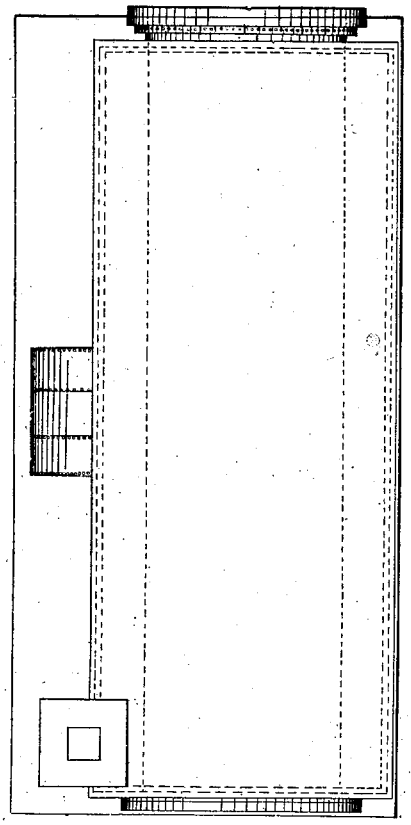
Figure 7:
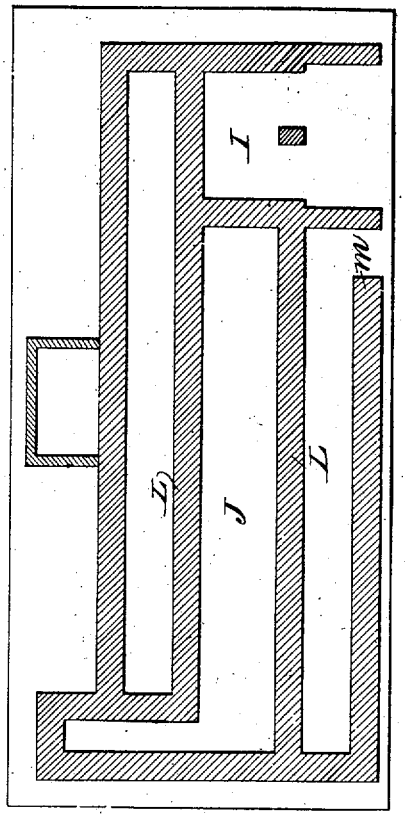
Figure 5:
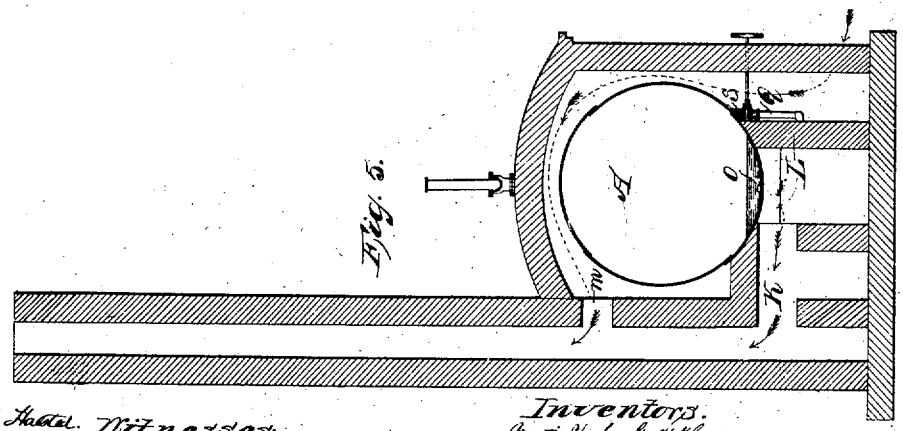

Figure 1 is a side elevation of one form of apparatus embodying our invention. Fig. 2 is an end elevation of the same. Fig. 3 is a vertical longitudinal section. Fig. 4 is a cross-section taken through the fire-chamber. Fig. 5 is a cross-section taken through the chimney. Fig. 6 is a top view, and Fig. 7 a ground plan.

Similar letters of reference indicate the same parts in all the drawings.

A represents a chamber, which may be of any required size and of any suitable form, but which we prefer to make cylindrical. We supply it with doors at each end, if desirable, so arranged as to be steam or air tight when closed, and we provide a thermometer, B, a vacuum-gage, C, a pressure-gage, D, a safety-valve, E, a pipe, F, with cock for the convenient passage of the residuum of oil or other material from the chamber when desired, and a pipe, G, with cock for the convenient passage of oil or other material into the chamber, provision being made for its retention therein, when the doors are open, by the elevation at each end thereof of a plate or flange, (represented by H H in Fig. 3.) This chamber we place over a furnace, I, and flue J, the latter serving to conduct the hot air, gases, &c., from the furnace to the chimney, with which it connects at K, thus conveying them beneath the chamber for its whole length, the latter being supported by the walls L L, which form the sides of the hot-air flue.

Before proceeding further with the description of the apparatus represented in the drawings, we will call attention to the fact that, as far as described, with the simple addition, if deemed desirable, of covering the chamber with lagging or any usual covering to prevent condensation, we have a complete wood-treating chamber, new in design and arrangement, and embodying two features of our invention which are new and important, viz: first, the vaporization of the substance or compound used in the treatment in the same chamber that contains the material being treated; and, second, the return of the condensed vapor not absorbed by said material immediately back into the body of the substance from which evolved, and that with little loss of heat, to be revaporized as often as desired.

We will now proceed to set forth the operation of our apparatus as far as described, and the manner of application of the process.

The material to be treated is placed in the chamber, as represented in Fig. 4, as also the coal-tar, oil, or other substance to be used in such treatment, as represented by O. The doors of the chamber being closed and the fire being kindled in the furnace, the vapors of the oil or other substance used will be evolved and fill the chamber, and may be raised to a temperature of, say, from 212° to 230° Fahrenheit, and be maintained thereat until the material under treatment, however large or dense, becomes heated to that temperature to its center, thus insuring the coagulation of the albumen and the vaporization and expulsion of the water or sap contained therein, and the impregnation thereof with the vapors being applied. A pressure also may be generated and maintained, if desired, thus more thoroughly protecting the wood, &c., and more rapidly and securely forcing the naphtha, light oils, or other substances evaporated at a low temperature to its center. When the process has been perfected to this extent, it is evident that by increasing the fire the temperature of the substance or compound used may be increased, thus more thoroughly drying the wood, &c., and evolving and applying carbolic acid, fixed oils, or whatever may be evolved under a high degree of heat; and under pressure which may be generated these also may be rapidly and surely forced to the center of the most bulky or dense material. As the oil or other substance used is vaporized in the chamber containing the material being treated, and the heat imparted to said substance to secure its vaporization is also utilized in maintaining the temperature in the chamber, and as the condensed material, however rapid the condensation may be, flows back immediately into the substance from which evolved, at a temperature but slightly reduced, to be revaporized by absorbing a few degrees of heat, it is evident that the volume of the vapor, its temperature, and the pressure in the chamber, when pressure may be deemed to be desirable, may be easily and economically maintained or regulated.

In the application of processes in which vapor is used only as a preparation for immersion in liquid, we simply provide for the flow from the chamber of the substances used in vaporization as soon as it has accomplished its purpose, and the flow in the chamber of the substance used in liquid form; or by the same arragement various substances may be applied in succession, either in form of liquid or vapor.

We will now proceed to describe other parts of our apparatus as represented in the drawings, which other parts are new and important, contributing to a more perfect treatment, if possible, and bringing the process of treatment more completely under the control of the operator.

Instead of applying ordinary lagging or felting to the surface of the treating-chamber, we prefer to inclose it by a casing, which may be conveniently made of brick, so proportioned in size relatively to the chamber A as to admit of the retention or passage of air around it as may be desired. This air-space, for the purpose of securing a stronger draft when desired, we prefer to connect with the chimney, as at M, (see Fig. 5,) the opening to the chimney being supplied with a damper so arranged that it may be conveniently opened or closed at pleasure. The casing is arranged with openings communicating with the air-space, which openings are provided with doors or other convenient fixtures, as represented at N, for the ingress of cold air and the regulation of its flow. These openings may be of such number, location, and arrangement as may be deemed to be best. When the outlets to this air-space are closed it gives the protection against condensation of a body of fixed air around the chamber, and when the doors communicating with the air outside and the damper in the passage connecting with the chimney are opened, it is evident that there will be a rapid current of cold air over the surface of the treating-chamber, thus promoting rapid condensation when desired. Again, we provide for conveying the condensed water or other substance from the chamber when desired. The arrangement represented in the drawings is as follows, viz: P P represent conductors, which run the entire length of the chamber, inclining from the ends to the center, and connecting with pipes Q, leading to a close receiver, R. These pipes are supplied with cocks S to stop the flow of the condensed vapors from the chamber whenever or as long as may be deemed desirable, they flowing over into the body of the oil as soon as the conductors are full. These conductors may be inclined to either or both ends, and may be of any suitable form and connected with pipes at any suitable point or points, or may convey the condensed vapors to any suitable receptacle. With these appliances, if, when the material being treated has been maintained at the temperature of, say, from 212° to 230° Fahrenheit for sufficient length of time to insure the vaporization of whatever water may be contained therein, or if at any other period of the process it is deemed desirable that the water expelled from the wood or the substances vaporizing at a low temperature shall be removed from the treating-chamber, such removal may be easily attained as follows, viz: The door or doors N being opened, and also the damper M, there will be a strong current of cold air around the chamber, as set forth above, cooling it sufficiently to condense the vapors within on the surface. As condensed they will flow down the surface into the conductors, and, the cocks S being opened, will pass to the receivers R. This evaporation of the water and its condensation and passage from the chamber may be continued until it is all removed, and the substance remaining or other substance that may be introduced may then be vaporized and applied.

With the above appliances for a rapid condensation of the vapors and for the removal from the chamber of the condensed water or other substances vaporizing at a low temperature, it is evident that a partial vacuum may be secured in the chamber if the fire be checked during such condensation, and thus the moisture will be more thoroughly removed from the wood, &c.

Having now described our mode of application and the apparatus which we have invented for practicing the same, we claim—

1. For the purpose of treating wood, textile fabrics, or other material, in whole or in part, with the vapors of oleaginous, antiseptic, or other substances or compounds, the vaporization of such substances or compounds in the same chamber in which the wood, &c., may be placed, or in a section thereof, or in a projection forming substantially a part of the same.

2. The return of the condensed vapors to the body of the heated substance from which evolved, to be revaporized as often as may be deemed desirable.

3. Such arrangement of apparatus that the condensed material may be caused to flow back into the body of the substance from which evolved or to flow from the chamber at will.

4. The combination, with a wood-treating chamber, of an air-space around it, so that the air may be confined therein or be caused to flow over the surface of the treating-chamber at will.

MARTIN VOORHEES.
G. W. N. CUSTIS.

Witnesses:
SINNICKSON CHEW,
JAMES M. CASSADY.